United States Patent
Nakahara

(10) Patent No.: US 10,300,717 B2
(45) Date of Patent: May 28, 2019

(54) PRINTING APPARATUS, PRINTING METHOD, AND NON-TRANSITORY COMPUTER-READABLE RECORDING MEDIUM

(71) Applicant: CASIO COMPUTER CO., LTD., Shibuya-ku, Tokyo (JP)

(72) Inventor: Shota Nakahara, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/639,787

(22) Filed: Jun. 30, 2017

(65) Prior Publication Data

US 2018/0072074 A1    Mar. 15, 2018

(30) Foreign Application Priority Data

Sep. 12, 2016  (JP) ................. 2016-177304

(51) Int. Cl.
| | |
|---|---|
| *B41J 3/36* | (2006.01) |
| *B41J 11/00* | (2006.01) |
| *B41J 13/00* | (2006.01) |
| *B41J 19/20* | (2006.01) |

(52) U.S. Cl.
CPC ............ *B41J 13/0009* (2013.01); *B41J 3/36* (2013.01); *B41J 11/0095* (2013.01); *B41J 19/205* (2013.01); *B41J 19/207* (2013.01)

(58) Field of Classification Search
CPC ...... B41J 13/0009; B41J 3/36; B41J 11/0095; B41J 19/205; B41J 19/207
See application file for complete search history.

(56) References Cited

U.S. PATENT DOCUMENTS

| | | | |
|---|---|---|---|
| 7,876,472 B2 | 1/2011 | Gudan et al. | |
| 2003/0001939 A1* | 1/2003 | Scofield | B41J 2/125 347/105 |
| 2005/0201808 A1* | 9/2005 | Barry | B41J 11/009 400/679 |
| 2011/0109678 A1* | 5/2011 | Schwartz | B41J 3/36 347/14 |

FOREIGN PATENT DOCUMENTS

JP    2008094101 A    4/2008

* cited by examiner

*Primary Examiner* — Henok D Legesse
(74) *Attorney, Agent, or Firm* — Holtz, Holtz & Volek PC

(57) ABSTRACT

A printing apparatus includes: a printer that performs printing on a printing medium; and a sensor that outputs a detection signal while the printing apparatus moves relative to the printing medium.

The printing apparatus determines whether the sensor is above a first surface or above a second surface of the printing medium, based on the detection signal output from the sensor, the first surface being a surface on which a moving amount of the printing apparatus with respect to the printing medium is acquired, and the second surface being a surface on which the moving amount is not acquired, and if the sensor is determined to be above the second surface, controls printing on the printing medium by the printer according to an estimated value of the moving amount with respect to the printing medium.

13 Claims, 10 Drawing Sheets

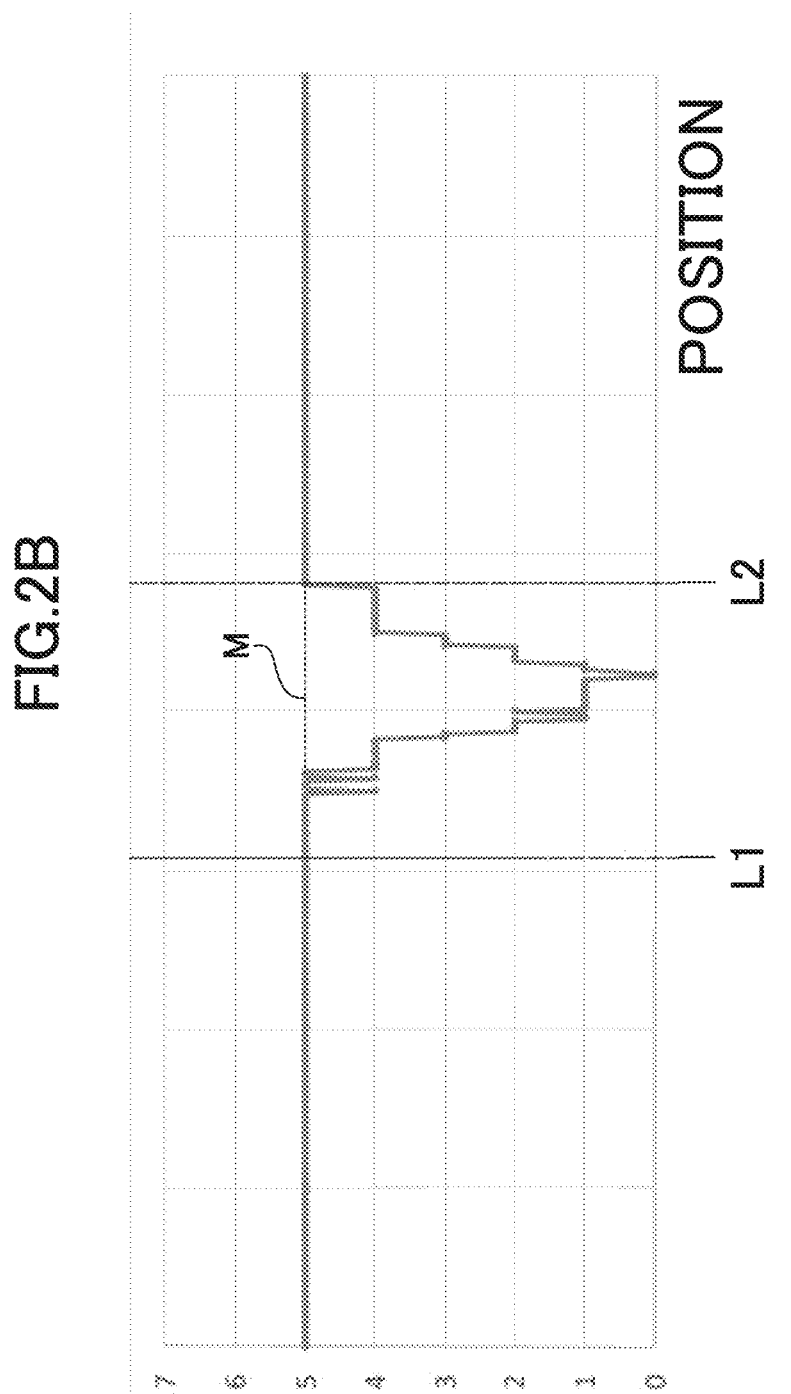

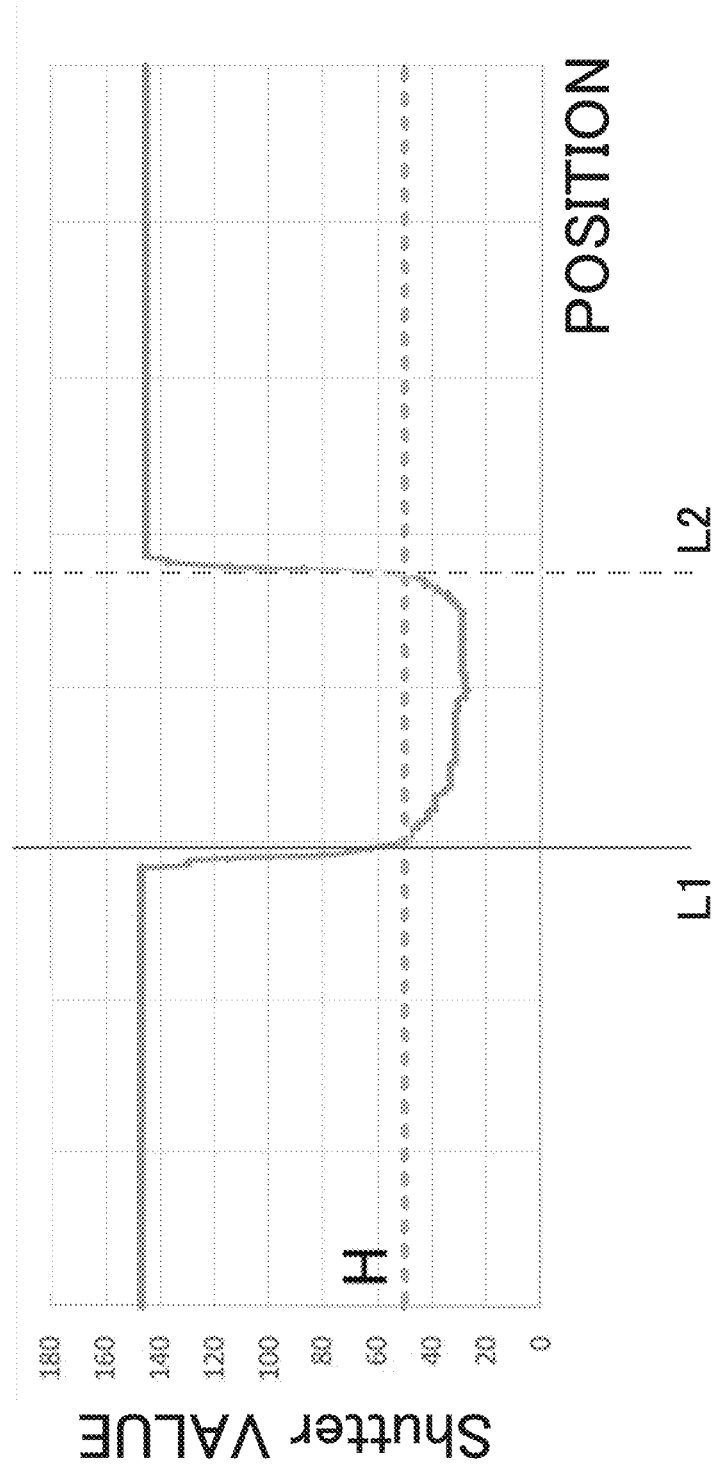

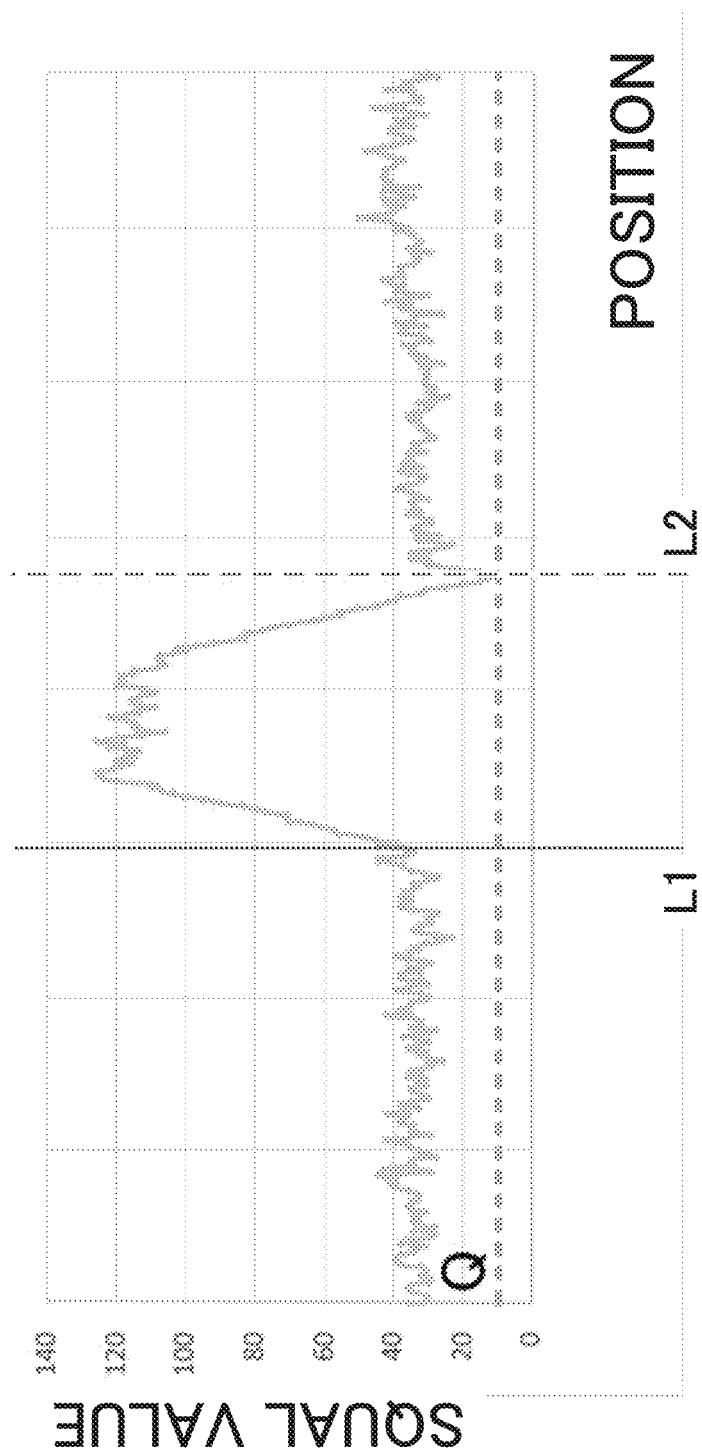

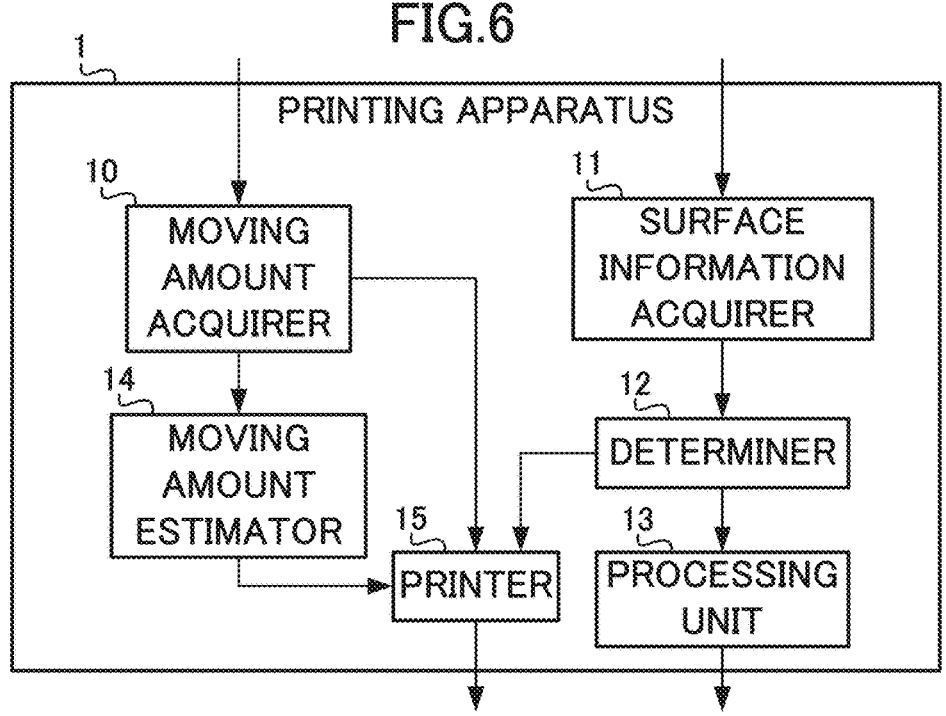
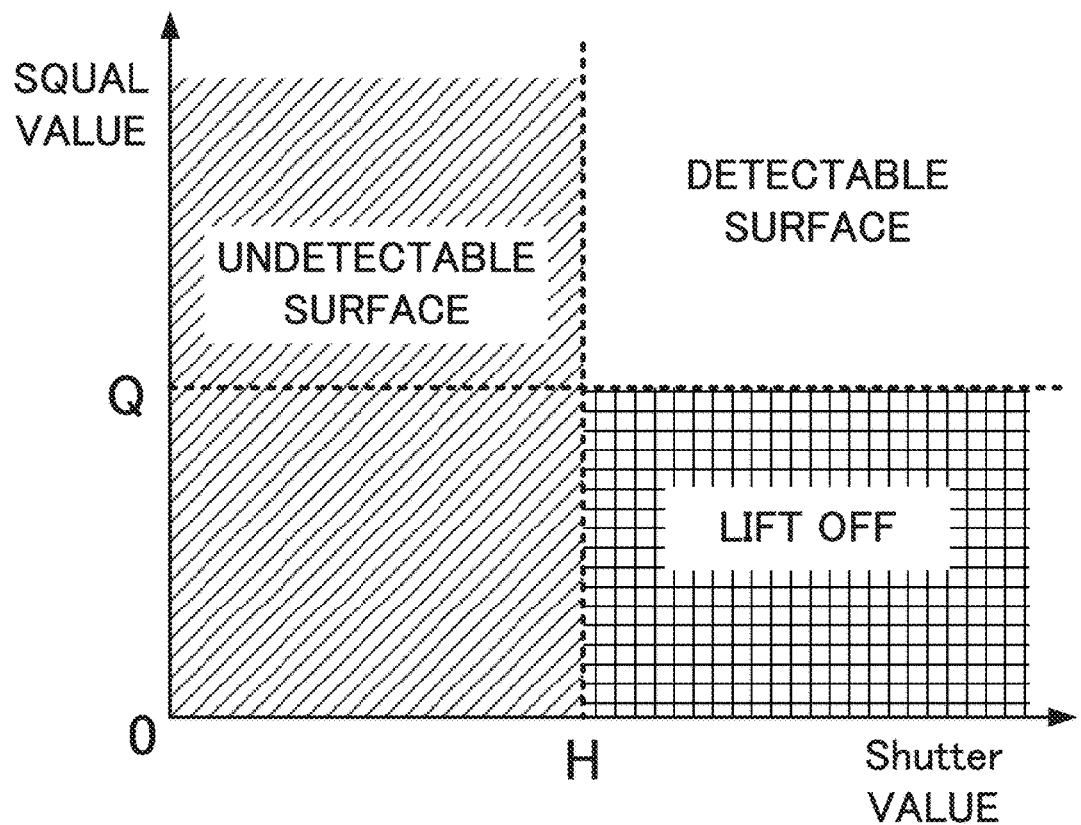

FIG.8

| NAME OF PRINTING MEDIUM | DETERMINATION RESULT | Shutter VALUE | SQUAL VALUE |
|---|---|---|---|
| RECYCLED PAPER | DETECTABLE SURFACE | 194 | 36 |
| PURE PAPER | DETECTABLE SURFACE | 178 | 25 |
| ENVELOPE | DETECTABLE SURFACE | 156 | 37 |
| COAT PAPER | DETECTABLE SURFACE | 87 | 94 |
| CARDBOARD | DETECTABLE SURFACE | 239 | 41 |
| LIFT OFF | LIFT OFF | 1000 | 0 |
| PLASTIC SHEET | UNDETECTABLE SURFACE | 29 | 96 |
| PLASTIC RULER | UNDETECTABLE SURFACE | 32 | 103 |
| TRANSPARENT PORTION OF CD MEDIA | UNDETECTABLE SURFACE | 15 | 52 |

PRINTING APPARATUS, PRINTING METHOD, AND NON-TRANSITORY COMPUTER-READABLE RECORDING MEDIUM

CROSS-REFERENCE TO RELATED APPLICATIONS

This application claims the benefit of Japanese Patent Application; No. 2016-177304, filed on Sep. 12, 2016, the entire disclosure of which is incorporated by reference herein.

FIELD

The present disclosure relates to a printing apparatus, a printing method, and a non-transitory computer-readable recording medium.

BACKGROUND

Printing apparatuses which print an image to be printed on a printing medium as the printing apparatuses move across the printing medium are known.

For example, Unexamined Japanese Patent Application Kokai Publication No. 2008-094101 discloses a handheld printer that detects the moving amount of a printing apparatus on a printing medium by means of an optical sensor, and discharges an ink according to the moving amount of the printing apparatus, which is detected by the optical sensor, thereby printing an image on the printing medium.

There are types of printing media on which an optical sensor may not accurately detect the moving amount of a printing apparatus easily. When the handheld printer described in the above-mentioned literature is used to print an image on such a printing medium, the printing may not be appropriately made because the optical sensor may not accurately detect the moving amount, and the printing quality is degraded.

In view of the above, it is desired to restrain degrading of printing quality by enabling appropriate printing even on such a printing medium on which an optical sensor may not accurately detect the moving amount of a printing apparatus easily.

SUMMARY

The present disclosure provides a printing apparatus, a printing method, and a non-transitory computer-readable recording medium, which can appropriately print an image to be printed, on various types of printing media, during printing performed as the printing apparatus moves.

A printing apparatus according to the present disclosure, to achieve the above-described advantages, comprises: a printer that performs printing on a printing medium; a sensor that outputs a detection signal while the printing apparatus moves relative to the printing medium; and a processor; wherein the processor determines whether the sensor is above a first surface or above a second surface of the printing medium, based on the detection signal output from the sensor, the first surface being a surface on which a moving amount of the printing apparatus with respect to the printing medium is acquired, and the second surface being a surface on which the moving amount is not acquired, and in a case where the processor determines that the sensor is above the second surface, the processor controls printing on the printing medium by the printer according to an estimated value of the moving amount with respect to the printing medium.

In a printing method of a printing apparatus, according to the present disclosure, to achieve the above-described advantages, the printing apparatus includes: a printer that performs printing on a printing medium; and a sensor that outputs a detection signal while the printing apparatus moves relative to the printing medium, and the printing method comprising: a determination step that determines whether the sensor is above a first surface or above a second surface of the printing medium, based on the detection signal output from the sensor, the first surface being a surface on which a moving amount of the printing apparatus with respect to the printing medium is acquired, and the second surface being a surface on which the moving amount is not acquired; and a first printing control step that controls, in a case where the sensor is determined to be above the second surface, printing on the printing medium by the printer according to an estimated value of the moving amount with respect to the printing medium.

In a non-transitory computer-readable recording medium recording therein a printing control program of a printing apparatus, according to the present disclosure, to achieve the above-described advantages, the printing apparatus includes: a printer that performs printing on a printing medium; and a sensor that outputs a detection signal while the printing apparatus moves relative to the printing medium, and the printing control program causes the computer to perform: determining whether the sensor is above a first surface or above a second surface of the printing medium, based on the detection signal output from the sensor, the first surface being a surface on which a moving amount of the printing apparatus with respect to the printing medium is acquired, and the second surface being a surface on which the moving amount is not acquired; and in a case where the sensor is determined to be above the second surface, controlling printing on the printing medium by the printer according to an estimated value of the moving amount with respect to the printing medium.

BRIEF DESCRIPTION OF THE DRAWINGS

A more complete understanding of this application can be obtained when the following detailed description is considered in conjunction with the following drawings, in which:

FIG. 2B is a diagram illustrating a change in the acquired value of the moving amount;

FIG. 3 is a diagram illustrating a change in the Shutter value;

FIG. 4 is a diagram illustrating a change in the SQUAL value;

FIG. 6 is a diagram illustrating a functional configuration of the printing apparatus according to the embodiment of the present disclosure;

FIG. 7 is a diagram for explaining determination performed by the printing apparatus according to the embodiment of the present disclosure;

FIG. 8 is another diagram for explaining determination performed by the printing apparatus according to the embodiment of the present disclosure;

DETAILED DESCRIPTION

Figure 1:
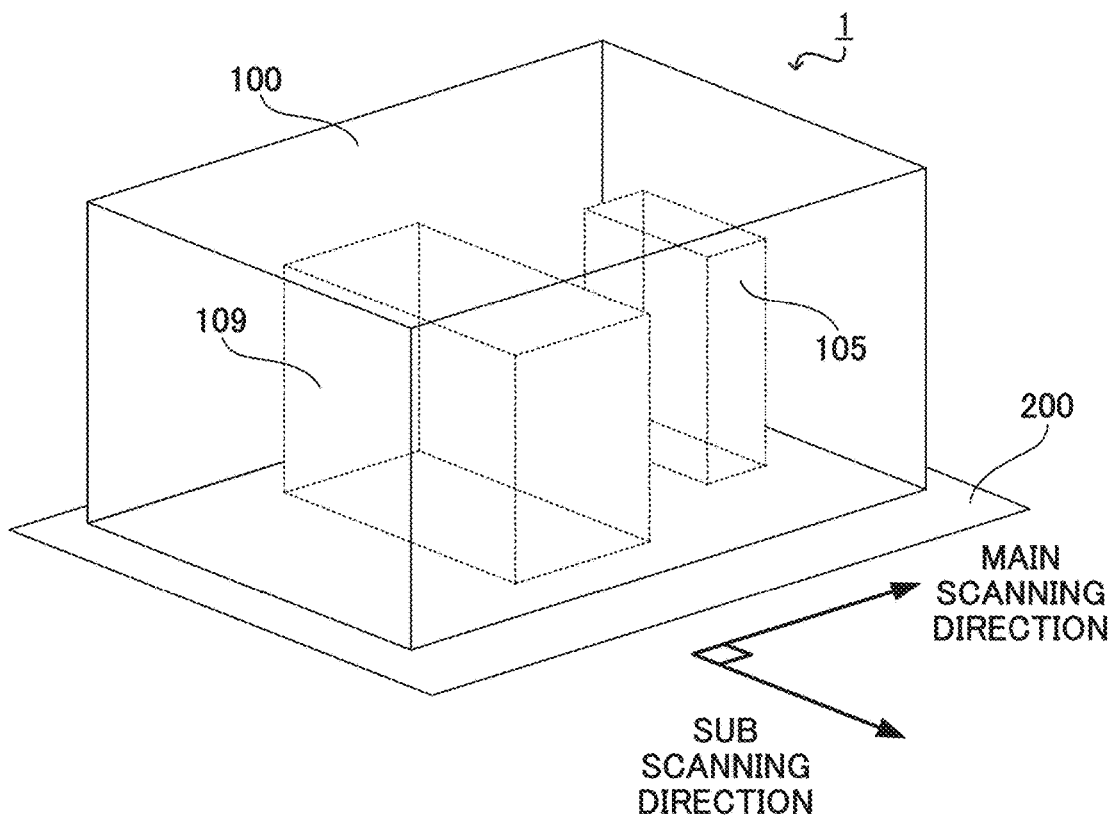
FIG. 1 is a diagram illustrating an outer appearance of a printing apparatus according to an embodiment of the present disclosure.

Hereinafter, the functions and operations of a printing apparatus according to an embodiment of the present disclosure is explained with reference to the drawings.

In the drawings, the same or equivalent configurations are assigned the same reference numeral.

The printing apparatus 1 illustrated in FIG. 1 is a manual scanning printing apparatus that can be held by a user to be moved across the printing medium 200, and can print an image to be printed, on the printing medium 200 as the printing apparatus 1 moves.

Manual scanning printing apparatuses are also referred to as handy printers or handheld printers, for example.

Such an aspect of the present embodiment is also possible in which the position of the printing apparatus 1 is fixed and the printing medium 200 can move, as long as the printing apparatus 1 can move relative to the printing medium 200.

The following explanation assumes that while printing, a user holds the printing apparatus 1 and moves the printing apparatus 1 on the printing medium 200 in a sub scanning direction in FIG. 1, which is the direction of the arrow P in FIG. 2A described later.

The image to be printed is an image to be drawn on the printing medium 200 during printing.

The image to be printed is also referred to as a printed image or a printing pattern, for example.

Some concrete examples of the image to be printed are characters, pictorial figures, marks, patterns, graphics, or a combination of them.

The printing medium 200 is an object on which the image to be printed is printed during printing.

The printing medium 200 is also referred to as a printed medium, a recording medium, or a printing object, for example.

Some concrete examples of the printing medium 200 are paper, fabric, synthetic resin, cardboard, boxes or bottles, for example.

The printing apparatus 1, which is a manual scanning printing apparatus, can print on more varieties of printing media 200 than stationary printing apparatuses that print while conveying the printing medium 200.

In other words, the printing apparatus 1 may not only print on a printing medium 200 such as paper which is easily conveyed, just as stationary printing apparatuses, but also print on a printing medium 200 such as fabric, synthetic resin, cardboard, boxes, or bottles which has a material or a form not easily conveyed and thus may not be printed easily with stationary printing apparatuses.

The printing apparatus 1 comprises, as illustrated in FIG. 1, a housing (apparatus main body) 100 to be held by a user, an optical sensor (sensor apparatus) 105 that outputs a detection signal, and a printer 109 that performs printing.

The housing 100 is formed to be easily held by a user with his or her hand, such as in a quadrangular prism shape or a rectangular solid shape.

The optical sensor 105 and the printer 109 are provided inside the housing 100.

The optical sensor 105 is provided on the bottom surface of the housing 100 in a position to face against the printing medium 200, and outputs a detection signal while moving with respect to the printing medium 200.

The bottom surface of the housing 100 is a surface of the housing 100, and is a surface that contacts or comes close with the printing medium 200 during printing.

Hereinafter, the functions and operations of the optical sensor 105 is explained with reference to FIGS. 2A, 2B to FIG. 4.

The optical sensor 105 outputs a detection signal at each sampling period.

The detection signal includes a moving amount detection signal for acquiring a moving amount which indicates a distance for which the printing apparatus 1 moved at each sampling period.

The optical sensor 105 outputs (supplies) a detection signal to a controller 101 described later.

The sampling period is set in advance, by taking into consideration the performance of the optical sensor 105.

The optical sensor 105, for example, comprises a laser optical sensor and comprises a laser light source and an image sensor.

The optical sensor 105 irradiates a surface of the printing medium 200 with laser light, and captures an image by laser light reflected on the surface of the printing medium 200, by means of the image sensor at each sampling period.

The optical sensor 105 analyzes a chronological change of the interference pattern of the laser light on the captured image, and thereby outputs the detection signal including the moving amount detection signal for acquiring the moving amount of the printing apparatus 1 with respect to the printing medium 200 at each sampling period.

Some printing media 200 include an undetectable surface (second surface). This undetectable surface is an area on the printing medium 200 and is an area on which the moving amount of the printing apparatus 1 is not accurately acquired based on the moving amount detection signal output from the optical sensor 105.

Some concrete examples of the undetectable surface are an area of the printing medium 200 which is transparent and an area of the printing medium 200 whose surface is extremely smooth.

On these areas, the reflection intensity of the laser light irradiated by the optical sensor 105 is extremely high, or the change of the interference pattern of the laser light captured at each movement is extremely small. This makes it difficult to accurately acquire the moving amount of the printing apparatus 1.

Note that the area on the printing medium 200 on which the moving amount of the printing apparatus 1 is accurately acquired based on the moving amount detection signal output from the optical sensor 105 is referred to as "detectable surface (first surface)".

Figure 2A:
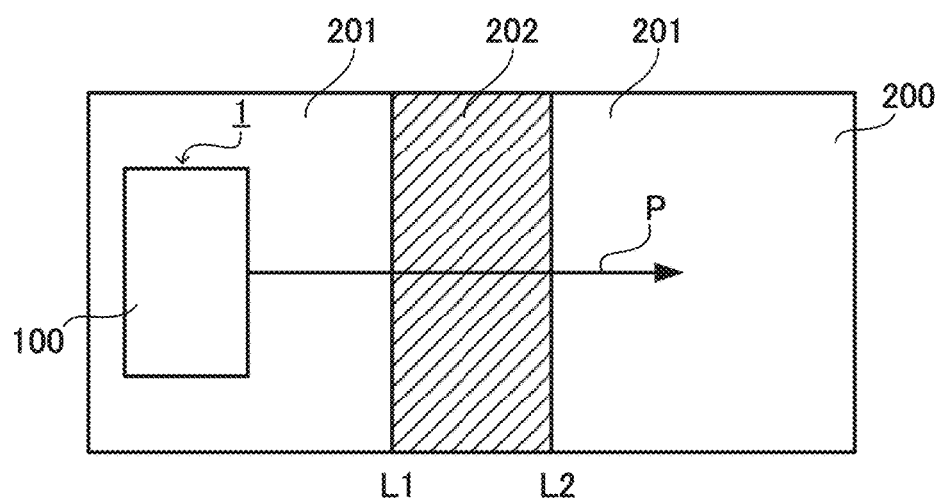
FIG. 2A is a diagram illustrating a movement of the printing apparatus according to the embodiment of the present disclosure on a printing medium.

FIG. 2B illustrates a change, with respect to the change of the position of the optical sensor 105, of the value of the moving amount with respect to the printing medium 200 at each sampling period acquired based on the moving amount detection signal output from the optical sensor 105, in a case where a user holds and moves the housing 100 of the printing apparatus 1, at a constant speed and in the direction illustrated by the arrow P, over the printing medium 200 that includes the detectable surface 201 and the undetectable surface 202 as illustrated in FIG. 2A.

Here, as illustrated in FIG. 2A, the position L1 is the position of the boundary between the detectable surface 201 and the undetectable surface 202 in a case where the printing apparatus 1 has moved in the direction illustrated in the arrow P, and the position L2 is the position of the boundary between the undetectable surface 202 and the detectable surface 201.

The same explanation applies to the positions L1 and L2 described later in FIG. 3 and FIG. 4.

Since the printing apparatus 1 moves at a constant speed, the moving amount of the printing apparatus 1 at each sampling period acquired based on the moving amount detection signal should be constant. However in reality, as illustrated in FIG. 2B, the moving amount for the period from the position L1 to the position L2 is not constant. Moreover, for a part of this period, a moving amount smaller than the moving amount acquired in the other periods is acquired. In other words, in a period in which the printing apparatus 1 is on the undetectable surface 202, the moving amount acquired based on the moving amount detection signal output by the optical sensor 105 is not constant; and the moving amount acquired in at least a part of this period is a value smaller than the moving amount acquired in the other periods.

That is, in at least a part of the period in which the printing apparatus 1 is on the undetectable surface 202, the acquired moving amount is not accurate and an inaccurate moving amount is acquired.

Here, "M" illustrated in FIG. 2B indicates an exemplary estimated value of the moving amount described later.

The detection signal output by the optical sensor 105 includes surface information corresponding to the state of the surface of the printing medium 200, in addition to the moving amount detection signal for acquiring the moving amount of the printing apparatus 1 with respect to the printing medium 200.

Specifically, the optical sensor 105 detects and outputs a Shutter value and a SQUAL value, as surface information.

The Shutter value is information representing how easily the surface of the printing medium 200 reflects light, and corresponds to "first surface information value".

The optical sensor 105 captures an image by the laser light reflected on the surface of the printing medium 200 by means of the image sensor, and detects and outputs, as the Shutter value, a value of time to capture the image, which is automatically adjusted so that average of luminance values of the pixels of the captured image falls under an adequate range set in advance. A concrete example of this value is an exposure time of the image sensor.

FIG. 3 illustrates a change in the Shutter value detected and output by the optical sensor 105, with respect to the change of the position of the optical sensor 105, in a case where a user holds and moves, at a constant speed and in the direction illustrated by the arrow P, the housing 100 of the printing apparatus 1 over the printing medium 200 that includes the detectable surface 201 and the undetectable surface 202 as illustrated in FIG. 2A.

The illustrated "H" represents a first threshold value described later.

As illustrated in FIG. 3, for a period from the position L1 to the position L2, the Shutter value is equal to or smaller than the first threshold value H. The Shutter value is greater than the first threshold value H during a period other than the period from the position L1 to the position L2.

That is, in a period in which the optical sensor 105 is on the undetectable surface 202, a Shutter value which is smaller than that in a period in which the optical sensor 105 is on the detectable surface 201 is detected and output.

Next, the SQUAL value is information representing smoothness of the surface of the printing medium 200, and corresponds to "second surface information value".

The SQUAL value is also referred to as a Surface Quality value, a surface quality value, and the like.

The optical sensor 105 captures an image by the laser light reflected on the surface of the printing medium 200 by means of the image sensor, and detects and outputs, as the SQUAL value, the number of feature points existing in the captured image.

FIG. 4 illustrates a change in the SQUAL value detected and output by the optical sensor 105, with respect to the change of the position of the optical sensor 105, in a case where a user holds and moves, at a constant speed and in the direction illustrated by the arrow P, the housing 100 of the printing apparatus 1 over the printing medium 200 that includes the detectable surface 201 and the undetectable surface 202 as illustrated in FIG. 2A.

The illustrated "Q" represents a second threshold value described later.

As illustrated in FIG. 4, in a period from the position L1 to the position L2, a SQUAL value that is greater than the SQUAL value detected and output during a period other than the period from the position L1 to the positon L2 is detected and output.

That is, in a period in which the optical sensor 105 is on the undetectable surface 202, a SQUAL value which is greater than that in a period in which the optical sensor 105 is on the detectable surface 201 is detected and output.

Note that the a feature that the SQUAL value takes a large value while the optical sensor 105 is on the undetectable surface 202 is not used in determination of the undetectable surface 202 in the present embodiment.

FIG. 4 is a drawing merely for facilitating understanding of the detection value of the moving amount, the Shutter value, and the SQUAL value, by way of comparison with FIGS. 2A, 2B, and FIG. 3.

Returning to FIG. 1, the printer 109 is provided on the bottom surface of the housing 100. The printer 109 prints the image to be printed, on the printing medium 200, by ink-jet method in which an ink in fine droplet is discharged on the printing medium 200.

Figure 5:
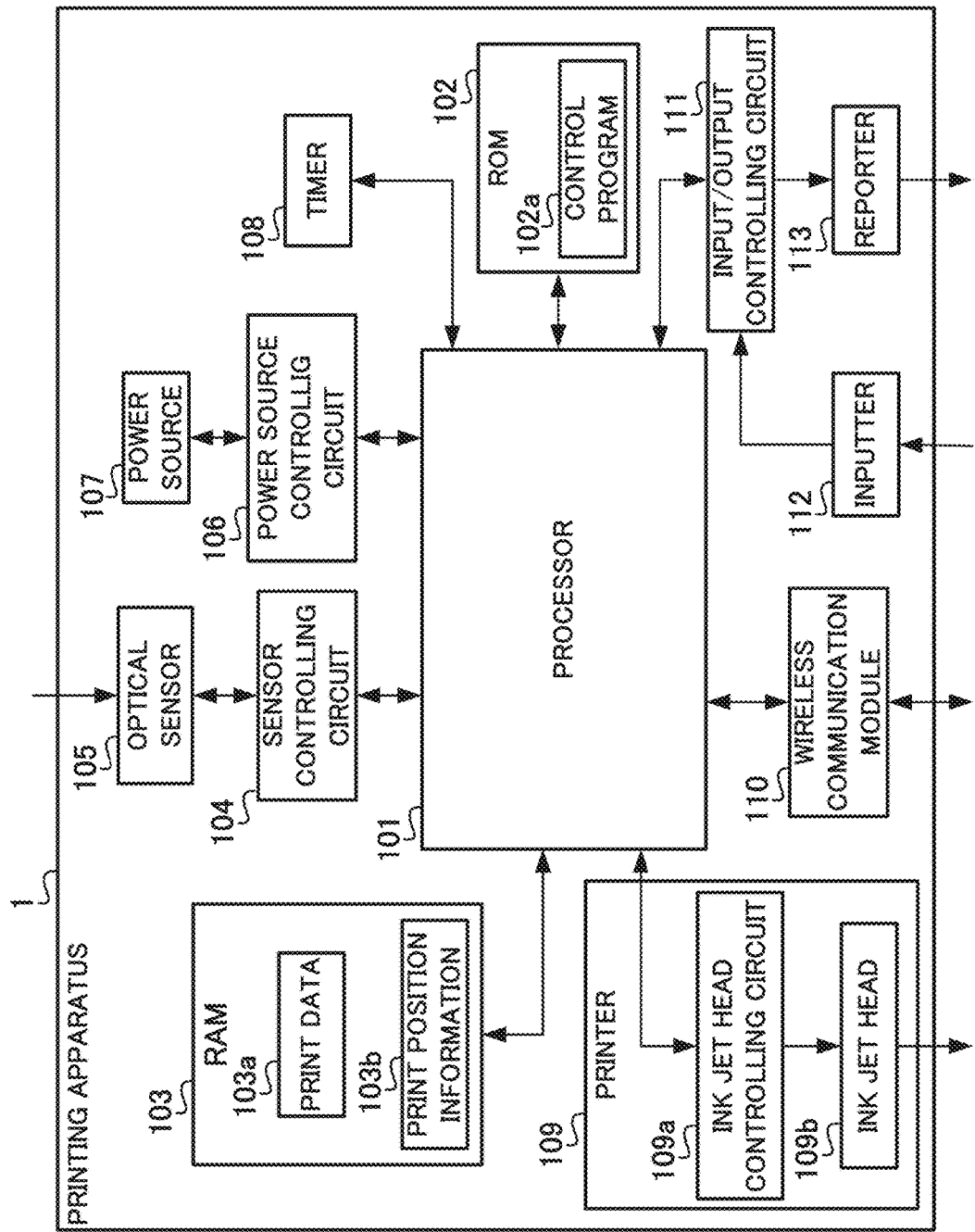
FIG. 5 is a diagram illustrating an electric configuration of the printing apparatus according to the embodiment of the present disclosure.

Specifically, the printer 109 comprises an ink jet head 109b as illustrated in FIG. 5.

The ink jet head 109b is also referred to as a print head, and the like.

The ink jet head 109b performs printing by discharging, to the printing medium 200, the ink in an ink tank not illustrated, in accordance with the control by an ink jet head controlling circuit 109a described later.

More specifically, in the ink jet head 109b, a plurality of nozzles is arranged. As the ink in the plurality of nozzles is heated by a heater, bubbles are generated. And the breakage of these bubbles causes the ink to be discharged to the printing medium 200 from the nozzles.

Note that the ink jet head 109b and the ink tank are also collectively referred to as an ink cartridge.

In the above-described embodiment, the printer 109 performed printing using an inkjet method. However, in the present disclosure, the printer 109 is not limited to an inkjet method, and may be any printing unit that can print in accordance with movement of the printing apparatus 1 on the printing medium 200, and for example, may perform printing using a thermal method or a thermal transfer method or drawing method with a pen.

FIG. 5 illustrates an electric configuration of the printing apparatus 1. As illustrated in FIG. 5, the printing apparatus 1, in addition to the above-described configuration, comprises a controller (processor) 101, a read-only memory (ROM) 102, a random access memory (RAM) 103, a sensor controlling circuit 104, a power source controlling circuit 106, a power source 107, a timer 108, an ink jet head controlling circuit 109a, a wireless communication module 110, an input/output controlling circuit 111, an inputter 112, and a reporter 113.

The controller (processor) 101 comprises a central processing unit (CPU), and performs various types of processing according to the programs and data stored in the ROM 102.

The controller 101, being connected to each portion of the printing apparatus 1 via a system bus which is a transmission path of commands and data, performs integrated control over the entire printing apparatus 1.

The ROM 102 stores various types of programs and various types of data used by the controller 101 to execute various types of processing. Specifically, the ROM 102 stores therein a control program 102a that is executed by the controller 101.

The ROM 102 stores therein a table in which various types of printing settings is included.

The RAM 103 stores therein data that is generated or obtained by the controller 101 by executing various types of processing. Specifically, the RAM 103 stores therein print data 103a and print position information 103b. The print data 103a is data representing the image to be printed.

The controller 101 obtains in advance the print data 103a from an external apparatus such as a personal computer (PC) or a smartphone via the wireless communication module 110, and stores the obtained print data 103a in the RAM 103.

The print position information 103b is data representing the position of the printing apparatus 1, which is based on a moving amount of the printing apparatus 1 with respect to the printing medium 200 obtained based on the moving amount detection signal output by the optical sensor 105.

The controller 101 generates print position information 103b by associating with each other the moving amount of the printing apparatus 1 with respect to the printing medium 200 acquired based on the moving amount detection signal output by the optical sensor 105 and the detection time clocked by the timer 108, and stores the print position information 103b in the RAM 103.

The RAM 103 functions as a work area of the controller 101.

The controller 101 temporarily writes programs or data in the RAM 103, and executes various types of processing by referring to the written programs or data as necessary.

The sensor controlling circuit 104 controls the optical sensor 105 in accordance with control by the controller 101.

The power source controlling circuit 106 controls the power source 107 in accordance with control by the controller 101.

The power source 107 comprises a battery, a cell, or the like, and supplies power to each portion of the printing apparatus 1 in accordance with control by the power source controlling circuit 106.

The timer 108, comprising a real time clock (RTC) or the like which continues clocking time even while supplying of power by the power source 107 stops, clocks the time.

The timer 108 supplies the data representing the clocking result to the controller 101.

The ink jet head controlling circuit 109a is provided in the printer 109, and controls discharge of ink by the ink jet head 109b in accordance with control by the controller 101.

Specifically, the ink jet head controlling circuit 109a transmits, one line by one line to the ink jet head 109b, the print data 103a stored in the RAM 103, at each printing period set by the controller 101.

The ink jet head controlling circuit 109a controls the electric conduction dot of the ink jet head 109b by a driver integrated circuit (IC) provided therein, and causes the ink to be discharged from the ink jet head 109b, thereby executing printing.

As described later, the printing period is set based on the moving amount of the printing apparatus 1.

As described above, the moving amount of the printing apparatus 1 is not correctly acquired on undetectable surface 202. Therefore, the printing period set based on such a moving amount does not take an accurate value either. Thus, on the undetectable surface 202, the moving amount is acquired based on the moving amount detection signal output from the optical sensor 105, and the printing period is set based on this moving amount. If the printer 109 performs printing according to this printing period, because of the inaccurate value of the printing period, the image to be printed is printed, for example, with white stripes or in collapsed manner. In this way, the image printed on the undetectable surface 202 has a degraded printing quality.

Thus, as described later, on the undetectable surface 202, the printing apparatus 1 uses an estimated value of the moving amount as the moving amount of the printing apparatus 1, instead of using the moving amount acquired based on the moving amount detection signal output from the optical sensor 105. In this manner, the printing period is appropriately set, to restrain the degrading in printing quality of the image printed on the undetectable surface 202.

The wireless communication module 110 comprises an interface for performing wireless communication with an external apparatus such as a PC and a smartphone, and communicates with the external apparatus via a wireless local area network (LAN) and the like.

The printing apparatus 1 obtains various types of data, including the print data 103a, from the external apparatus via the wireless communication module 110.

The input/output controlling circuit 111 controls the inputter 112 and the reporter 113 in accordance with control by the controller 101.

The inputter 112 comprises an input device such as an input key, a button, a switch, a touchpad, or a touch panel, and receives various types of operational instructions input by a user, and supplies the received operational instructions to the controller 101.

The reporter 113 performs various types of reporting in accordance with control by the input/output controlling circuit 111. Specifically, the reporter 113 comprises light emitting diode (LED) and performs reporting by emitting the LED in a mode corresponding to the content of the report.

The reporter 113 performs error reporting by flashing the LED at an interval set in advance. The error reporting is to report printing failure, for example.

FIG. 6 illustrates a functional configuration of the printing apparatus 1.

As illustrated in FIG. 6, the printing apparatus 1 functionally comprises a moving amount acquirer 10, a surface information acquirer 11, a determiner 12, a processing unit 13, a moving amount estimator 14, and a printer 15.

The controller 101 reads out the control program 102a stored in the ROM 102 to the RAM 103 and executes the control program 102a to control the printing apparatus 1, thereby functioning as each of these portions.

Hereinafter, each function of the printing apparatus 1 is explained with reference to FIG. 6 to FIG. 8.

The moving amount acquirer 10 acquires the moving amount of the printing apparatus 1 on the printing medium 200 based on the moving amount detection signal output by the optical sensor 105.

The surface information acquirer 11 acquires the surface information from the optical sensor 105. Specifically, the surface information acquirer 11 acquires, as surface information, the Shutter value and the SQUAL value.

The determiner 12 determines whether the area on the printing medium 200 facing against the optical sensor 105 is a detectable surface 201 or an undetectable surface 202, based on the determination as to whether the surface information satisfies the detectable condition.

The determiner 12 determines that the surface information satisfies the detectable condition in a case where the Shutter value is greater than the first threshold value H and the SQUAL value is greater than the second threshold value Q. The detectable condition corresponds to "specific condition".

As described above, in a case where the optical sensor 105 is on the undetectable surface 202, the detected Shutter value is smaller than in a case where the optical sensor 105 is on the detectable surface 201; and the detected SQUAL value is greater than in a case where the optical sensor 105 is on the detectable surface 201.

As illustrated in FIG. 7, the determiner 12 determines that the area on the printing medium 200 facing against the optical sensor 105 is a detectable surface 201, in a case where the Shutter value is greater than the first threshold value H and the SQUAL value is greater than the second threshold value Q.

The first threshold value H and the second threshold value Q are set in advance according to any method such as experiments.

In the present embodiment, the first threshold value H is set to be 50 and the second threshold value Q is set to be 10 in advance respectively.

Note that as illustrated in FIG. 7, the determiner 12 determines that the area on the printing medium 200 facing against the optical sensor 105 is an undetectable surface 202, in a case where the Shutter value is equal to or smaller than the first threshold value H.

As described above, the feature that the SQUAL value takes a large value while the optical sensor 105 is on the undetectable surface 202 is not used in determination as to whether the optical sensor 105 is on the undetectable surface 202 in the present embodiment.

FIG. 8 illustrates an example of determination by the determiner 12.

FIG. 8 illustrates the name of a printing medium 200, the Shutter value and the SQUAL value of each printing medium 200, and the determination result of the determiner 12 with respect to each printing medium 200, in association with one another.

For example, Shutter value of recycled paper is 194 and is greater than 50 that is set as the first threshold value H, and SQUAL value of recycled paper is 36 and is greater than 10 that is set as the second threshold value Q. Therefore, the determiner 12 determines, determining that the surface information of the recycled paper satisfies the detectable condition, that the recycled paper is a detectable surface 201.

The "Lift off" in FIG. 8 represents a state in which the printing apparatus 1 is lifted by a user from the printing medium 200, thereby bringing the printing apparatus 1 away from the surface of the printing medium 200 at a comparatively great distance.

In a case where the printing apparatus 1 is lifted off, the Shutter value becomes 1000 which is extremely great, and the SQUAL value becomes 0 which is extremely small, as illustrated in FIG. 8.

The determiner 12 determines whether the printing apparatus 1 is lifted off, by determining whether the surface information satisfies a lift off condition.

The determiner 12 determines that the lift off condition is satisfied in a case where the Shutter value is greater than the first threshold value H and the SQUAL value is equal to or smaller than the second threshold value Q. The lift off condition corresponds to the "second condition".

As described above, when the printing apparatus 1 is lifted off, an extremely great Shutter value is detected and an extremely small SQUAL value is detected.

In view of this, as illustrated in FIG. 7, the determiner 12 determines that the printing apparatus 1 is lifted off in a case where the Shutter value is greater than the first threshold value H and the SQUAL value is equal to or smaller than the second threshold value Q.

Returning to FIG. 6, the processing unit 13 executes error processing set in advance, in a case where the determiner 12 has determined that the surface information satisfies the lift off condition.

Specifically, as the error processing, the processing unit 13 stops printing by controlling the printer 109, and controls the reporter 113 to execute error reporting.

As described above, in a case where the surface information is determined to satisfy the lift off condition, the printing apparatus 1 is in the state to be lifted up by a user and to be apart from the printing medium 200. It is not desirable to continue discharging the ink in such a situation. In view of this, the processing unit 13 stops the printing, and reports the user of the printing failure or of the lifting off.

The moving amount estimator 14, in a case where the determiner 12 determines that the surface information does not satisfy the detectable condition, acquires an estimated value of the moving amount of the printing apparatus 1 on the printing medium 200 based on the moving amount acquired by moving amount acquirer 10 in a case where the surface information satisfies the detectable condition.

Specifically, the moving amount estimator 14, in a case where the determiner 12 determines that the surface information does not satisfy the detectable condition, acquires, as an estimated value, the moving amount acquired by the moving amount acquirer 10 in a case where the surface information acquirer 11 acquires the surface information which is one of the pieces of surface information that have been determined by the determiner 12 in the past to satisfy the detectable condition and whose detection time is the latest among them.

As a result, the moving amount estimator 14 can acquire, as an estimated value of the moving amount, the accurate moving amount acquired by the moving amount acquirer 10 immediately before the optical sensor 105 enters the undetectable surface 202 from the detectable surface 201 and while the optical sensor 105 is on the detectable surface 201.

The printer 15, in a case where the determiner 12 determines that the surface information satisfies the detectable condition, prints the image to be printed, on the printing medium 200, by means of the printer 109 according to the moving amount acquired by the moving amount acquirer 10.

On the other hand, the printer 15, in a case where the determiner 12 determines that the surface information does not satisfy the detectable condition, prints the image to be printed, on the printing medium 200, by means of the printer 109 according to the estimated value acquired by the moving amount estimator 14.

Specifically, the printer 15 calculates the moving speed of the printing apparatus 1, based on either the moving amount acquired by the moving amount acquirer 10 or the estimated value acquired by the moving amount estimator 14. Then, the printing period is set based on the calculated moving speed.

According to the printing period set in this way, the printer 109 performs printing. In other words, the printer 109 performs printing based on either the moving amount acquired by the moving amount acquirer 10 or the estimated value acquired by the moving amount estimator 14.

As described above, the moving amount of the printing apparatus 1 is acquired accurately on the detectable surface 201, while on the undetectable surface 202, the moving amount of the printing apparatus 1 is not accurately acquired.

On the detectable surface 201, the printer 15 performs printing by means of the printer 109, according to the accurate moving amount acquired by the moving amount detecting device 10.

On the other hand, on the undetectable surface 202, the printer 15 performs printing by means of the printer 109, according to the estimated value acquired by the moving amount estimator 14.

As a result, the degrading of the printing quality on the undetectable surface 202 is restrained.

Hereinafter, the printing control performed by the printing apparatus 1 that comprises the above-describe physical and functional configuration is explained with reference to the flowchart illustrated in FIG. 9.

The printing apparatus 1 acquires the print data 103a from an external apparatus such as a PC and a smartphone via the wireless communication module 110, and stores the print data 103a in the RAM 103.

Figure 9:
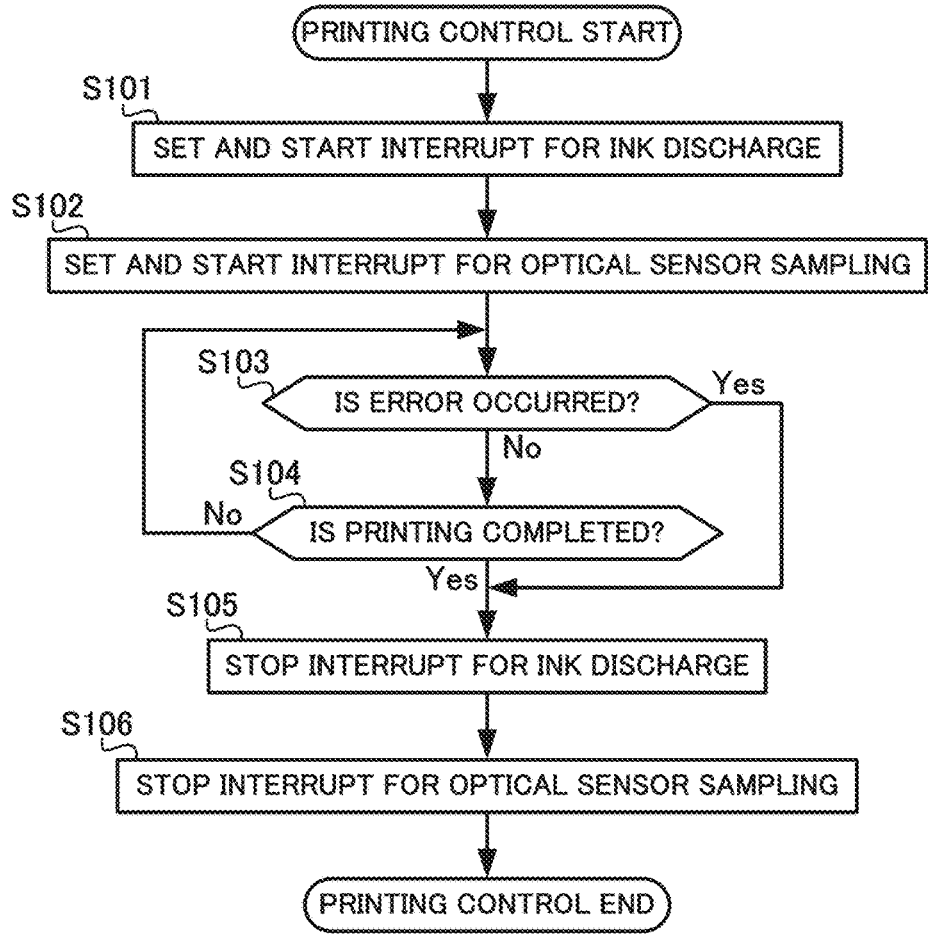
FIG. 9 is a flowchart for explaining printing control performed by the printing apparatus according to the embodiment of the present disclosure.

When the timer 108 detects elapse of an initial printing period after the user instructed start of print by operating the inputter 112, the printing apparatus 1 starts printing control illustrated in the flowchart of FIG. 9.

The initial printing period is an initial value of the printing period, and is set in advance by any method such as experiments. As described later, the printing period is set by the sampling processing.

However, at the start of the printing control, the sampling processing is not yet performed, and no printing period set by the sampling processing exists.

Thus, the initial printing period set in advance is used, at the start of the printing control.

When the printing control is started, the controller 101 first sets interrupt for the ink discharge processing and starts ink discharge processing (Step S101).

Hereafter, the controller 101 performs interrupt for the ink discharge processing each time the timer 108 detects the elapse of the printing period until the execution of Step S105 described later, and repeatedly performs the ink discharge processing.

Figure 10:
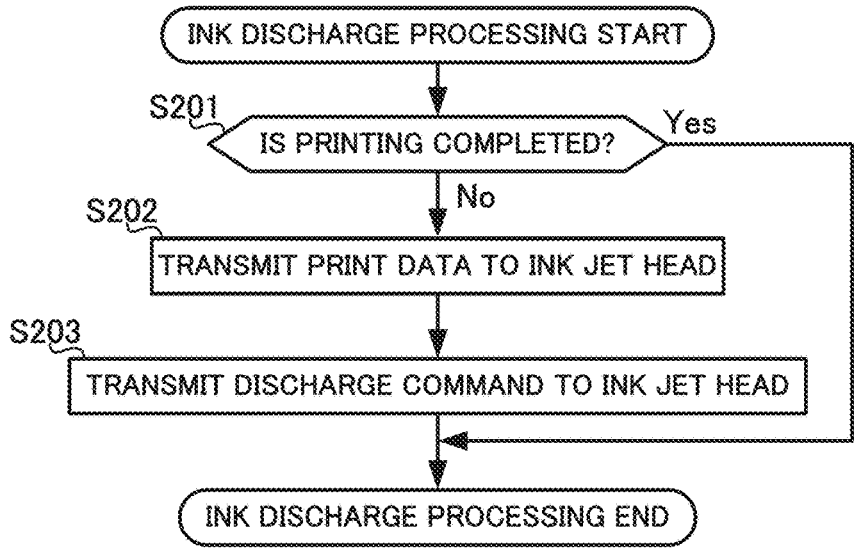
FIG. 10 is a flowchart for explaining ink discharge processing performed by the printing apparatus according to the embodiment of the present disclosure.

Hereinafter, the ink discharge processing is explained with reference to the flowchart in FIG. 10.

When the ink discharge processing is started, the printer 15 first determines whether the printing of the print data 103a is completed (Step S201).

Specifically, the printer 15 determines whether the printing of the print data 103a is completed, by determining whether all the pieces of print data 103a have been sent to the ink jet head 109b.

In a case where determining that the printing of the print data 103a is completed (Step S201; Yes), the printer 15 ends the ink discharge processing.

In a case where determining that the printing of the print data 103a is not completed yet (Step S201; No), the printer 15 transmits one line print data 103a to the ink jet head 109b (Step S202).

Next, the printer 15 transmits a discharge command to the ink jet head 109b, to discharge the ink (Step S203), and ends the ink discharge processing.

Returning to FIG. 9, after starting the ink discharge processing in Step S101, the controller 101 sets interrupt for the sampling processing, and starts the sampling processing (Step S102).

Hereafter, the controller 101 performs interrupt for the sampling processing each time the timer 108 detects the elapse of the sampling period until the execution of Step S106 described later, and repeatedly performs the sampling processing.

Note that in the interrupt setting for the sampling processing, the interrupt for the sampling processing is set at each sampling period set in advance.

Hereinafter, the sampling processing is explained with reference to the flowchart in FIG. 11.

When the sampling processing is started, the moving amount acquirer 10 first acquires the moving amount of the printing apparatus 1 based on the moving amount detection signal output by the optical sensor 105 (Step S301).

Then, the surface information acquirer 11 acquires, as the surface information, the Shutter value and the SQUAL value by means of the optical sensor 105 (Step S302).

Next, the determiner 12 executes undetectable surface determining processing (Step S303).

Figure 12:
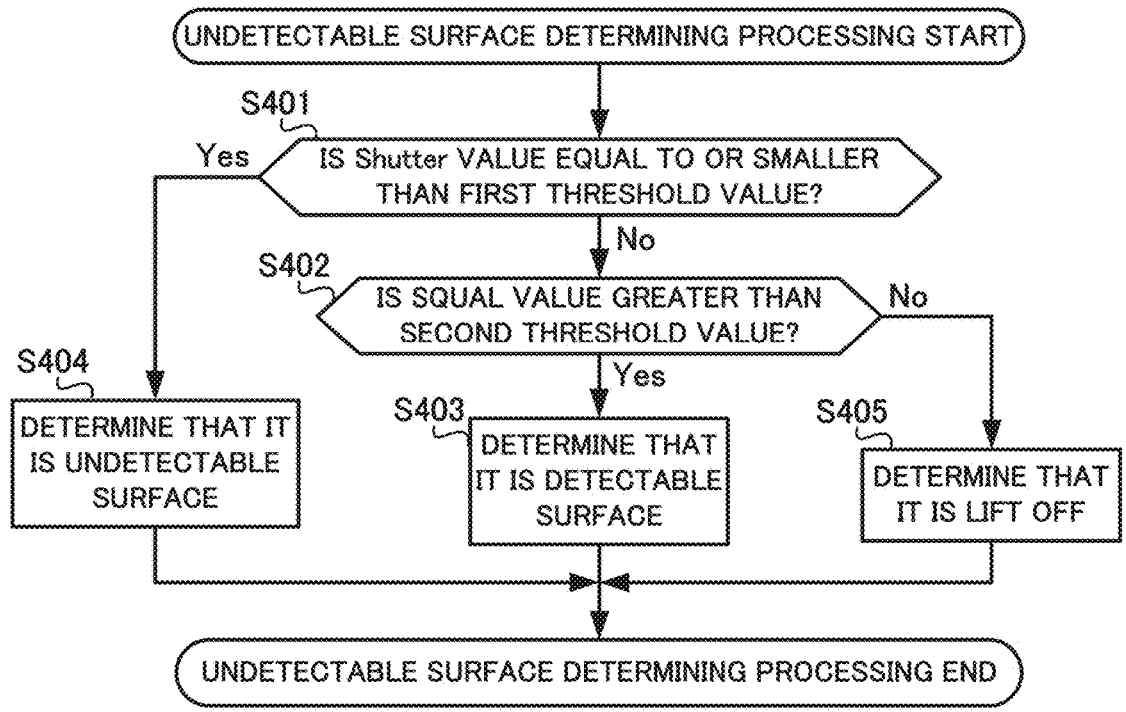
FIG. 12 is a flowchart for explaining undetectable surface determination processing performed by the printing apparatus according to the embodiment of the present disclosure.

Hereinafter, the undetectable surface determining processing is explained with reference to the flowchart in FIG. 12.

When the undetectable surface determining processing is started, the determiner 12 first determines whether the Shutter value is equal to or smaller than the first threshold value H (Step S401).

In a case where determining that the Shutter value is equal to or smaller than the first threshold value H (Step S401; Yes), the determiner 12 determines that the area of the printing medium 200 facing against the optical sensor 105 is an undetectable surface 202 (Step S404), and ends the undetectable surface determining processing.

In a case where determining that the Shutter value is greater than the first threshold value H (Step S401; No), the determiner 12 determines whether the SQUAL value is greater than the second threshold value Q (Step S402).

In a case where determining that the SQUAL value is equal to or smaller than the second threshold value Q (Step S402; No), the determiner 12 determines that the printing apparatus 1 is lifted off (Step S405), and ends the undetectable surface determining processing.

In a case where determining that the SQUAL value is greater than the second threshold value Q (Step S402; Yes), the determiner 12 determines that the area of the printing medium 200 facing against the optical sensor 105 is a detectable surface 201 (Step S403), and ends the undetectable surface determining processing.

Figure 11:
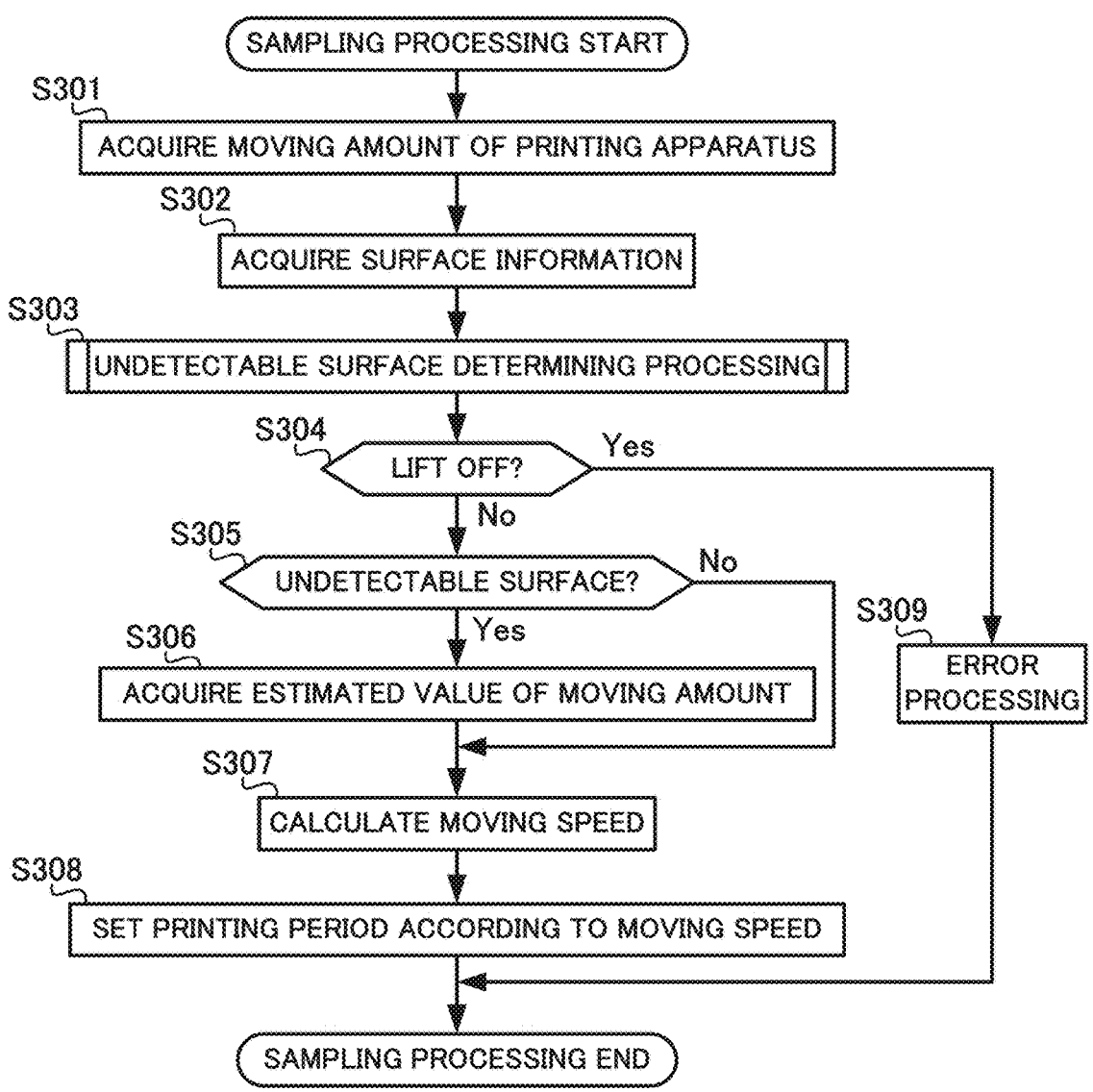
FIG. 11 is a flowchart for explaining sampling processing performed by the printing apparatus according to the embodiment of the present disclosure.

Returning to the flowchart in FIG. 11, after executing the processing in Step S303, the controller 101 determines whether the printing apparatus 1 was determined to be lifted off in Step S303 (Step S304).

In a case where the controller 101 has determined that the printing apparatus 1 was determined to be lifted off in Step S303 (Step S304; Yes), the processing unit 13 performs error processing (Step S309), and ends the sampling processing.

On the other hand, in a case where the controller 101 has determined that the printing apparatus 1 was not determined to be lifted off in Step S303 (Step S304; No), the controller 101 determines whether the area of the printing medium 200 facing against the optical sensor 105 was determined to be an undetectable surface 202 in Step S303 (Step S305).

In a case where the controller 101 has determined that the area of the printing medium 200 facing against the optical sensor 105 was not determined to be an undetectable surface 202 in Step S303 (Step S305; No), the printer 15 calculates the moving speed of the printing apparatus 1 using the moving amount acquired by the moving amount detecting device 10 at Step S301 (Step S307).

On the other hand, in a case where the controller 101 has determined that the area of the printing medium 200 facing against the optical sensor 105 was determined to be an undetectable surface 202 in Step S303 (Step S305; Yes), the moving amount estimator 14 acquires an estimated value of the moving amount of the printing apparatus 1 (Step S306).

Then, the printer 15 calculates the moving speed of the printing apparatus 1 using the estimated value of the moving amount acquired by the moving amount estimator 14 at Step S306 (Step S307).

The controller 101 sets the printing period according to the moving speed calculated in Step S307 (Step S308), and ends the sampling processing.

As described above, the printing period is set by the sampling processing.

The controller 101 interrupts with the sampling processing at each sampling period set in advance, and repeatedly performs the sampling processing.

Therefore, the printing period is updated at each sampling period.

Returning to FIG. 9, the controller 101 determines whether an error has occurred after starting the sampling processing in Step S102 (Step S103).

In a case where the controller 101 determines that an error has occurred (Step S103; Yes), the processing goes to Step S105.

In a case where determining that no error has occurred (Step S103; No), the controller 101 determines whether the printing of the print data 103a is completed (Step S104).

In a case where the controller 101 has determined that printing of the print data 103a is not completed yet (Step S104; No), the processing returns to Step S103.

According to this operation, either until an error is determined to have occurred (Step S103; Yes), or until printing is determined to have been completed (Step S104; Yes), the ink discharge processing and the sampling processing are repeatedly executed.

In a case where an error is determined to have occurred (Step S103; Yes), or in a case where printing of the print data 103a is determined to have been completed (Step S104; Yes), the controller 101 stops the interrupt for the ink discharge processing (Step S105).

Next, the controller 101 stops interrupt for the sampling processing (Step S106), and ends the printing control.

As described above, on the detectable surface 201, the printing apparatus 1 prints according to the moving amount acquired by the moving amount acquirer 10.

On the other hand, on the undetectable surface 202, the printing apparatus 1 prints according to the estimated value of the moving amount acquired by the moving amount estimator 14.

Accordingly, the printing apparatus 1 can print appropriately not only on the detectable surface 201 but also on the undetectable surface 202.

Therefore, the printing apparatus 1 can print the image to be printed appropriately, both on the printing medium 200 that does not include any undetectable surface 202 and on the printing medium 200 that includes an undetectable surface 202.

That is, the printing apparatus 1 can print the image to be printed appropriately on various types of printing media 200, while printing performed as the printing apparatus moves.

So far, the embodiment of the present disclosure has been explained. However, the above-described embodiment is an example, and the application scope of the present disclosure is not limited to this. That is, the embodiment of the present disclosure can be applied in various ways, and various embodiments are included in the scope of the present disclosure.

In the above-described embodiment, the moving amount estimator 14 of the printing apparatus 1 was explained to acquire an estimated value of the moving amount of the printing apparatus 1 based on the moving amount acquired by the moving amount acquirer 10 in a case where the surface information satisfies the detectable condition. However, this is merely an example, and the moving amount estimator 14 can acquire an estimated value of the moving amount in any method.

For example, the moving amount estimator 14 may acquire, as an estimated value, the value set in advance before the printer 15 starts printing of the image to be printed.

This value can be set in any method such as experiments.

Specifically, an average of the speed in which each of a plurality of users moves the printing apparatus 1, which is acquired by an experiment, may be used as an estimated value of the moving amount Alternatively, the moving amount estimator 14 may acquire, as an estimated value of the moving amount, an average of the moving amounts for a predetermined time length acquired by the moving amount acquirer 10 immediately before the optical sensor 105 moves from the detectable surface 201 onto the undetectable surface 202 and while the optical sensor 105 is on the detectable surface 201.

Alternatively, the moving amount estimator 14 may acquire an estimated value of the moving amount, by extrapolating the chronological change of the moving amount acquired by the moving amount acquirer 10 immediately before the optical sensor 105 moves from the detectable surface 201 onto the undetectable surface 202. Any function including a linear function and a trigonometric function can be used for this extrapolation.

In the above-described embodiment, the printing apparatus 1 was explained to detect the Shutter value and the SQUAL value, as surface information. However, this is merely an example, and the printing apparatus 1 can detect, as surface information, any information representing the state of the surface of the printing medium 200. For example, the printing apparatus 1 may detect only either one of the Shutter value and the SQUAL value, as surface information.

The printing apparatus 1 may detect information different from the Shutter value and from the SQUAL value, as surface information.

In the above-described embodiment, the detectable condition and the lift off condition were explained to be a condition that relates to both of the Shutter value and the SQUAL value. However, this is merely an example, and the detectable condition and the lift off condition may be a condition that relates to either the Shutter value or the SQUAL value.

For example, the printing apparatus 1 may determine that the detectable condition is satisfied in a case where the Shutter value is greater than the first threshold value H, regardless of the SQUAL value.

The above-described embodiment illustrated an example in which the feature that the SQUAL value takes a large value while the optical sensor 105 is on the undetectable surface 202 is not used in determining the undetectable surface 202. However, this is merely an example, and the feature that the SQUAL value takes a comparatively large value while the optical sensor 105 is on the undetectable surface 202 may be used in determination of the undetectable surface 202.

Specifically, by setting the second threshold value Q to be greater than the SQUAL value detected on the detectable surface 201 and to be smaller than the SQUAL value detected on the undetectable surface 202, it may be determined to be an undetectable surface 202, in a case where the Shutter value is equal to or smaller than the first threshold value H and the SQUAL value is greater than the second threshold value Q.

Note that in this method, it is determined to be a detectable surface 201, in a case where the Shutter value is greater than the first threshold value H and the SQUAL value is equal to or smaller than the second threshold value Q. The case in which the Shutter value is equal to or smaller than the first threshold value H and the SQUAL value is equal to or smaller than the second threshold value Q and the case in which the Shutter value is greater than the first threshold value H and the SQUAL value is greater than the second threshold value Q, it may be determined to be an error that is different from a lift off error. The case in which the Shutter value is extremely great and the SQUAL value is extremely small may be determined to be a lift off.

This embodiment makes it possible to perform determination more accurately than in the above-described embodiment in which the feature that the SQUAL value takes a comparatively large value while the optical sensor 105 is on the undetectable surface 202 is not used in determination of the undetectable surface 202.

Alternatively, determination of an undetectable surface 202 may be performed by only using the feature that the SQUAL value takes a comparatively large value while the optical sensor 105 is on the undetectable surface 202.

Specifically, it may be determined to be an undetectable surface 202, in a case where the SQUAL value is greater than the above-mentioned second threshold value Q, and it may be determined to be a detectable surface 201 in a case where the SQUAL value is equal to or smaller than the second threshold value Q.

According to this embodiment, even in a case where it is difficult to acquire the Shutter value, only the SQUAL value can be used to determine the undetectable surface 202.

In the above-described embodiment, the surface information was explained to be detected by the optical sensor 105 outputting a moving amount detection signal for acquiring the moving amount of the printing apparatus 1. However, this is merely an example, and an aspect may be employed in which another sensor different from the optical sensor 105 outputting a moving amount detection signal for acquiring the moving amount of the printing apparatus 1 may detect the surface information.

In the above-described embodiment, the print data 103*a* was explained to be acquired from an external apparatus via the wireless communication module 110. However, this is merely an example, and the printing apparatus 1 may acquire the print data 103*a* in any method.

For example, the printing apparatus 1 may comprise a wired communication interface such as a universal serial bus (USB) port, and directly acquire the print data 103*a* from an external storage medium by means of wired communication.

The printing apparatus 1 may acquire the print data 103*a* by receiving a user input of the print data 103*a* through the input device 112.

In the above-described embodiment, the printing apparatus 1 was explained to be a manual scanning printing apparatus. However, this is merely an example, and the printing apparatus 1 may be a self-propelled printing apparatus comprising a moving device that moves the printing apparatus 1 on the printing medium 200 and perform printing as it moves.

In the above-described embodiment, the printing apparatus 1 was explained to report an error by emitting light by LEDs. However, this is merely an example, and the printing apparatus 1 may report an error in any method.

For example, the printing apparatus 1 may comprise a speaker that outputs a sound, and report an error by outputting a warning sound from this speaker.

In the above-described embodiment, the optical sensor 105 was explained to comprise a laser optical sensor. However, this is merely an example, and the optical sensor 105 may comprise any type of optical sensor.

For example, the optical sensor 105 may comprise an LED optical sensor that outputs a moving amount detection signal for acquiring the moving amount of the printing apparatus 1, by irradiating the surface of the printing medium 200 with light from the LED light source, and imaging and analyzing shadows generated by concave and convex shapes on the surface of the printing medium 200.

It is needless to say that a printing apparatus that incorporates in advance therein a configuration to realize the function according to the present disclosure can be provided. However, it is also possible to make an existing information processing apparatus or the like function as the printing apparatus according to the present disclosure, by applying thereto a program.

That is, by applying a program for realizing each functional configuration of a printing apparatus according to the present disclosure so that the CPU or the like that controls the existing information processing apparatus or the like executes that program, the existing information processing apparatus or the like can function as the printing apparatus according to the present disclosure.

Note that any method can be used to apply such a program. For example, the program can be applied by being stored in a non-transitory computer-readable storage medium such as a flexible disc, a compact disc (CD)-ROM, a digital versatile disc (DVD)-ROM, and a memory card.

It is also possible to superpose the program on the carrier wave and apply the program via a communication medium such as the Internet.

For example, the program may be posted, for distribution, on a bulletin board (BBS: Bulletin Board System) on a communication network.

Then, it may be configured to execute the above-described processing by activating this program and executing the program under the control of the operating system (OS) just as the other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A printing apparatus comprising:
   a printer that performs printing on a printing medium;
   an optical sensor that outputs a detection signal while the printing apparatus moves relative to the printing medium; and
   a processor configured to perform processes comprising:
      determining whether the optical sensor is above a first surface or above a second surface of the printing medium, based on the detection signal output from the optical sensor, the first surface being a surface on which a moving amount of the printing apparatus with respect to the printing medium is acquired, and the second surface being a surface on which the moving amount of the printing apparatus is not accurately acquired based on the detection signal output from the optical sensor, and
      in a case where the processor determines that the optical sensor is above the second surface, acquiring an estimated value of the moving amount with respect to the printing medium, and controlling printing on the printing medium by the printer according to the acquired estimated value of the moving amount,
   wherein the estimated value of the moving amount is an average of moving amounts acquired based on the detection signal for a predetermined period of time while the processor determines that the optical sensor is above the first surface, the predetermined period of time being immediately before the optical sensor changes from being above the first surface to being above the second surface.

2. The printing apparatus according to claim 1, wherein in a case where the processor determines that the sensor is above the first surface, the processor acquires the moving amount based on the detection signal, and controls printing on the printing medium by the printer according to the moving amount.

3. The printing apparatus according to claim 1, wherein:
   the detection signal includes surface information that corresponds to a state of a surface of the printing medium,
   in a case where the surface information satisfies a specific condition, the processor determines that the sensor is above the first surface, and
   in a case where the surface information does not satisfy the specific condition, the processor determines that the sensor is above the second surface.

4. The printing apparatus according to claim 3, wherein the surface information includes at least one of a first surface information value that represents how easily the surface of the printing medium reflects light and a second surface information value that represents a smoothness of the surface of the printing medium.

5. The printing apparatus according to claim 4, wherein the specific condition is satisfied in a case where the first surface information value is greater than a first threshold value and the second surface information value is greater than a second threshold value.

6. The printing apparatus according to claim 5, wherein the processor performs pre-set processing in a case where the surface information satisfies a second condition that is different from the specific condition, and
   wherein the second condition is satisfied in a case where the first surface information value is greater than the first threshold value and the second surface information value is equal to or smaller than the second threshold value.

7. A printing method of a printing apparatus, the printing apparatus including a printer that performs printing on a printing medium and an optical sensor that outputs a detection signal while the printing apparatus moves relative to the printing medium, and the printing method comprising:
   determining whether the optical sensor is above a first surface or above a second surface of the printing medium, based on the detection signal output from the optical sensor, the first surface being a surface on which a moving amount of the printing apparatus with respect to the printing medium is acquired, and the second surface being a surface on which the moving amount of the printing apparatus is not accurately acquired based on the detection signal output from the optical sensor; and
   in a case where the determining determines that the optical sensor is above the second surface, acquiring an estimated value of the moving amount with respect to the printing medium, and controlling printing on the printing medium by the printer according to the acquired estimated value of the moving amount,
   wherein the estimated value of the moving amount is an average of moving amounts acquired based on the detection signal for a predetermined period of time while the processor determines that the optical sensor is above the first surface, the predetermined period of time being immediately before the optical sensor changes from being above the first surface to being above the second surface.

8. The printing method according to claim 7, wherein the controlling comprises acquiring, in a case where the sensor is determined to be above the first surface, the moving amount based on the detection signal, and controlling printing on the printing medium by the printer according to the moving amount.

9. The printing method according to claim 7, wherein the detection signal includes surface information that corresponds to a state of a surface of the printing medium, and
   wherein in the determining, in a case where the surface information satisfies a specific condition, the sensor is determined to be above the first surface, and in a case where the surface information does not satisfy the specific condition, the sensor is determined to be above the second surface.

10. The printing method according to claim 9, wherein the surface information includes at least one of a first surface information value that represents how easily the surface of the printing medium reflects light and a second surface information value that represents a smoothness of the surface of the printing medium.

11. The printing method according to claim 10, wherein the specific condition is satisfied in a case where the first surface information value is greater than a first threshold value and the second surface information value is greater than a second threshold value.

12. The printing method according to claim 11, further comprising performing pre-set processing in a case where the surface information satisfies a second condition that is different from the specific condition, wherein the second condition is satisfied in a case where the first surface information value is greater than the first threshold value and the second surface information value is equal to or smaller than the second threshold value.

13. A non-transitory computer-readable recording medium recording therein a printing control program of a printing apparatus, the printing apparatus including a printer that performs printing on a printing medium and an optical sensor that outputs a detection signal while the printing apparatus moves relative to the printing medium, and the printing control program controlling the computer to perform processes comprising:

determining whether the optical sensor is above a first surface or above a second surface of the printing medium, based on the detection signal output from the optical sensor, the first surface being a surface on which a moving amount of the printing apparatus with respect to the printing medium is acquired, and the second surface being a surface on which the moving amount of the printing apparatus is not accurately acquired based on the detection signal output from the optical sensor; and in a case where the determining determines that the optical sensor is above the second surface, acquiring an estimated value of the moving amount with respect to the printing medium, and controlling printing on the printing medium by the printer according to the acquired estimated value of the moving amount, wherein the estimated value of the moving amount is an average of moving amounts acquired based on the detection signal for a predetermined period of time while the processor determines that the optical sensor is above the first surface, the predetermined period of time being immediately before the optical sensor changes from being above the first surface to being above the second surface.

* * * * *